(12) United States Patent
Endo (10) Patent No.: US 8,566,948 B2
(45) Date of Patent: Oct. 22, 2013

(54) METHOD AND SYSTEM FOR CONTROLLING ACCESS TO LOGICAL UNIT OF A STORAGE DEVICE SHARED BY COMPUTERS

(75) Inventor: Kotaro Endo, Fuchu (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 1736 days.

(21) Appl. No.: 11/725,472

(22) Filed: Mar. 20, 2007

(65) Prior Publication Data

US 2007/0250907 A1 Oct. 25, 2007

(30) Foreign Application Priority Data

Mar. 31, 2006 (JP) ................................. 2006-100486

(51) Int. Cl.
*G06F 21/10* (2013.01)

(52) U.S. Cl.
USPC .............. 726/26; 713/180; 713/181; 709/226

(58) Field of Classification Search
USPC ....................... 726/1–7, 26–30; 713/168–181; 709/223–226
See application file for complete search history.

(56) References Cited

U.S. PATENT DOCUMENTS

| | | | |
|---|---|---|---|
| 6,760,829 B2 * | 7/2004 | Lasserre et al. ................ | 711/207 |
| 6,895,483 B2 * | 5/2005 | Eguchi et al. .................. | 711/165 |
| 6,934,799 B2 * | 8/2005 | Acharya et al. ................ | 711/112 |
| 6,976,134 B1 * | 12/2005 | Lolayekar et al. ............. | 711/148 |
| 7,082,462 B1 * | 7/2006 | Matsunami et al. ........... | 709/223 |
| 7,127,602 B1 * | 10/2006 | Bakke et al. ....................... | 713/2 |
| 7,165,258 B1 * | 1/2007 | Kuik et al. ...................... | 719/326 |
| 7,346,924 B2 * | 3/2008 | Miyawaki et al. ................ | 726/6 |
| 7,367,045 B2 * | 4/2008 | Ofek et al. ......................... | 726/2 |
| 7,367,050 B2 * | 4/2008 | Mitsuoka et al. ................. | 726/2 |
| 2002/0107810 A1 * | 8/2002 | Nishio et al. .................... | 705/59 |
| 2005/0021727 A1 * | 1/2005 | Matsunami et al. ........... | 709/223 |
| 2005/0091333 A1 * | 4/2005 | Kobayashi et al. ........... | 709/212 |

FOREIGN PATENT DOCUMENTS

| | | |
|---|---|---|
| JP | 1-255917 | 10/1989 |
| JP | 2001-75853 | 3/2001 |

OTHER PUBLICATIONS

Notification of Reasons for Rejection from the Japanese patent office for Application No. 2006-100486, Mailed Mar. 17, 2009, with English language translation thereof, total of 5 pages.

* cited by examiner

*Primary Examiner* — William Powers
(74) *Attorney, Agent, or Firm* — Finnegan, Henderson, Farabow, Garrett & Dunner, L.L.P.

(57) ABSTRACT

An acquisition unit of a user terminal acquires an initiator ID including a user ID and a computer ID. The initiator ID is transmitted by a transmitter unit, and then, received by a transmitter/receiver unit of a storage device. A LUDB stores information determining a LU corresponding to each user ID of several users. A masking unit refers to the LUDB to determine the LU corresponding to the user ID. If the received initiator ID differs from an initiator ID stored in a table corresponding to the determined LU, an access control unit refuses access to the LU by the user terminal.

8 Claims, 4 Drawing Sheets

LUDB

| User ID | LU |
|---|---|
| endo | LU1 |
| tanaka | LU2 |
| ⋮ | ⋮ |

Reservation table

| LU | Initiator ID |
|---|---|
| LU1 | Initiator ID1 |
| LU2 | Initiator ID2 |
| ⋮ | ⋮ |

METHOD AND SYSTEM FOR CONTROLLING ACCESS TO LOGICAL UNIT OF A STORAGE DEVICE SHARED BY COMPUTERS

CROSS-REFERENCE TO RELATED APPLICATIONS

This application is based upon and claims the benefit of priority from prior Japanese Patent Application No. 2006-100486, filed Mar. 31, 2006, the entire contents of which are incorporated herein by reference.

BACKGROUND OF THE INVENTION

1. Field of the Invention

The present invention relates to a storage system including computers used by users and a storage device shared by these computers. In particular, the present invention relates to access control to a logical unit of the storage device shared by the computers.

2. Description of the Related Art

A storage system includes several computers which can be used by any user and a storage device shared by the computers. In the storage system, working environment information of the computer for each user is stored in a logical unit (LU) in the storage device which is located at, for example, a data center. In other words, each user owns a LU in the storage device. In such a storage system, a user does not own any computer.

These computers and the storage device are connected via a network, for example, a Storage Area Network (SAN), using a fiber channel technique. The user can use own working environment information through any computer connected to the storage device via the SAN.

None of the computers connected via the SAN have a hard disk. The computers can be used by any user. In brief, the computers and users do not have the relationship of one-to-one correspondence, and instead have a relationship of N-to-M. The number of computers is denoted by "N" and the number of users is denoted by "m".

The foregoing storage system has the following two advantages. First, the user is not required to carry around a computer, and can use a computer provided at each branch office given as per the infrastructure. Second, the user can arbitrarily select and use any of non-used computers; therefore, the computer availability is enhanced.

For example, large enterprises have many branch offices all over the world. In this case, working environment information of all employees are stored in the storage device located at the company data center. Here, the working environment information includes an operating system, application software, those configurations and data which are used by the employee.

Any computer provided at any of the branch offices can be connected to any user's working environment information. By doing so, any user can use any computer as if it were own computer. For example, even if the employee goes to another branch office on business, the employee can access own working environment information.

However, the foregoing storage system has the following problem. Namely, the computers and the users have the relationship of N-to-M correspondence; for this reason, a mutual exclusion problem arises among computers and among users.

The computer used for the foregoing storage system includes no hard disk. For this reason, when the user turns off the computer to end the use of the computer, no data remains on the computer. Thus, even if several users sequentially use the same computer, the following user is in no way affected by how the previous user uses the computer; therefore, there is no mutual exclusion problem.

On the other hand, the operating system was traditionally stored in a hard disk of each computer; for this reason, it is not designed to work on multiple computers simultaneously. For example, in the case that a user forgets to turn off the power of a computer connecting own working environment information, and subsequently connects to own working environment information from another computer, the operating system malfunctions. As a result, there is a possibility that data is destroyed. In other words, if several computers simultaneously access the same working environment information, a mutual exclusion problem arises.

In order to solve the foregoing problem, the following technique is disclosed (see Jpn. Pat. Appln. KOKAI Publication No. 2001-75853). According to the technique, a table showing a relationship between computers and LUs storing working environment information of users is stored in the storage device. Then, an accessing LU is mapped in the table depending on the connected computer. The technique can solve the foregoing mutual exclusion problem because the computer accesses the working environment information in only correspondence of the intended computer and the working environment information.

According to the foregoing technique, only the computer corresponding to the LU storing the working environment information can access the working environment information. Therefore, the mutual exclusion problem is solved.

However, when the correspondence of the computer and the working environment information changes, namely, the user changes the using computer, storage device configuration of correspondence between computers and LUs must be changed every time.

Thus, a change of the correspondence of the computer and the working environment information is accurately grasped to always reflect it in the storage device.

However, this is difficult in a storage system in which many users exist, and the correspondence of users and computers changes variously in accordance with requests from users.

BRIEF SUMMARY OF THE INVENTION

An object of the present invention is to provide a storage system which can readily manage a storage device without changing configurations of the storage device even if the correspondence of a computer and a working environment changes. Another object of the present invention is to provide a storage device used for the storage system, and an access control method.

According to one aspect of the present invention, there is provided a storage system comprising: several computers used by several users; and a storage device shared by the several computers, and having logical units, each of which is corresponding to each of the several users.

Each of the several computers of the storage system include: an acquisition unit configured to acquire an initiator identification including a user identification identifying the user, and a computer identification identifying the computer in accordance with an operation by the user using the computer; and a transmitter unit which transmits the initiator identification acquired by the acquisition unit to the storage device. The storage device includes: a receiver unit which receives the initiator identification transmitted by the transmitter unit; a database which stores information on correspondences of a user identification with a logical unit which is corresponding to a user identified by the user identification; a masking unit configured to refer to the database to determine a logical unit corresponding to user identification included in the initiator identification received by the receiver unit, and restricts access from a computer identified by the computer identification included in the initiator identification received by the receiver to the logical unit; a table which stores information on correspondences of a logical unit with an initiator identification which is including a computer identification identifying a computer having permission of access to the logical unit; and an access control unit configured to refuse access by the computer identified by the computer identification included in the received initiator identification when the initiator identification received by the receiver unit differs from the initiator identification stored in the table corresponding to the logical unit determined by the masking unit.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

One embodiment of the present invention will be explained with reference to the accompanying drawings.

Figure 1:
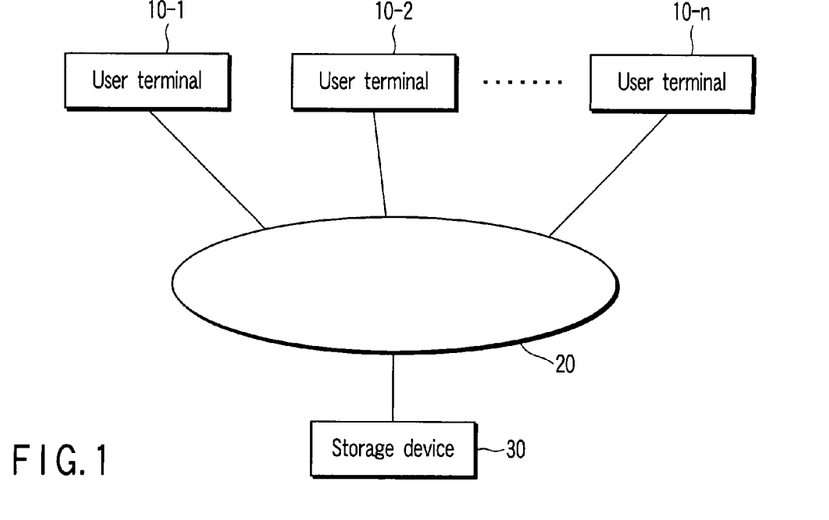
FIG. 1 is a block diagram schematically showing the configuration of a storage system according to one embodiment of the present invention.

FIG. 1 is a block diagram schematically showing the configuration of a storage system according to one embodiment of the present invention. As shown in FIG. 1, user terminals (computers) 10-1, 10-2, . . . 10-$n$ each of which can be used by any user are connected to make communications with a storage device 30 via a network 20 such as IP-Storage Area Network (IP-SAN) using Ethernet®. The number of user terminals is denoted by "n" and the number of users is denoted by "m".

These user terminals 10-1, 10-2, . . . 10-$n$ are each a diskless computer, which includes no disk such as hard disk. Moreover, each of the user terminals 10-1, 10-2, . . . 10-$n$ can be used by any user of m users.

The storage device 30 is shared by the user terminals 10-1, 10-2, . . . 10-$n$. Moreover, the storage device 30 has m Logical Units (LUs) corresponding to m users. The details of the LU will be described later.

According to this embodiment, a protocol conforming to Internet Small computer System Interface (iSCSI) is used to make communications via the network 20 between the user terminals 10-1, 10-2, . . . 10-$n$ and the storage device 30.

Figure 2:
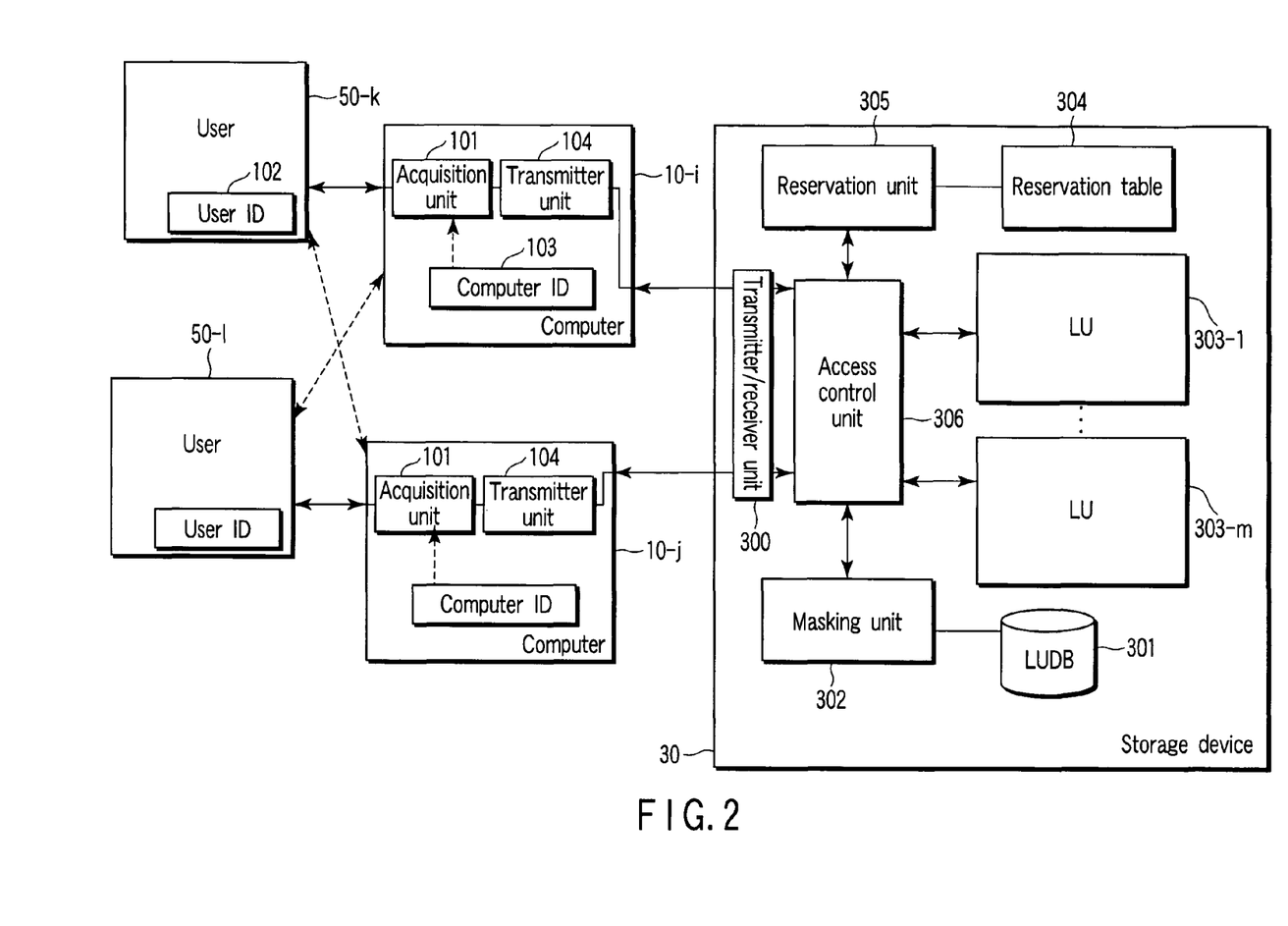
FIG. 2 is a block diagram showing each configuration of a user terminal 10-$i$ and storage device 30 in the storage system shown in FIG. 1.

FIG. 2 is a block diagram showing a functional configuration of user terminals 10-$i$ ($i$=1, 2, . . . n) and 10-$j$ ($j$=1, 2, . . . n, j·i) and the storage device 30.

Here, a user using the user terminal 10-$i$ is denoted by a user 50-$k$ (k=1, 2, . . . m). In this case, the user 50-$k$ can also use any user terminal other than the user terminal 10-$i$, for example, the user terminal 10-$j$. The user terminal 10-$j$ has the same configuration as the user terminal 10-$i$ described below. A user other than the user 50-$k$, for example, user 50-$l$ (l=1, 2, . . . m, l·k) may also use user terminal 10-$i$ or 10-$j$.

The user terminal 10-$i$ has an acquisition unit 101 and a transmitter unit 104. The acquisition unit 101 acquires a user ID (user identification information) 102 for identifying the user 50-$k$ using the user terminal 10-$i$.

The acquisition unit 101 acquires a user name inputted by the user 50-$k$ using the user terminal 10-$i$ as user ID 102 when the user terminal 10-$i$ is used by the user 50-$k$. Incidentally, the acquisition unit 101 also has the following configuration. For example, the acquisition unit 101 reads information on an IC card used when the user 50-$k$ using the user terminal 10-$i$ logs in, and thereby, acquires the user ID 102.

The acquisition unit 101 acquires a computer ID (computer identification information) 103 for identifying the user terminal 10-$i$. The computer ID 103 is previously stored in the user terminal 10-$i$.

The acquisition unit 101 further acquires an initiator ID (initiator identification information) that includes the acquired user ID 102 and computer ID 103.

The acquisition unit 101 acquires some of the following requests from the user 50-$k$. The first request is a reservation request to reserve (a use right of) the LU corresponding to the user 50-$k$ in the storage device 30 for (user 50-$k$ of) the user terminal 10-$i$. The second request is a forced reservation request to forcedly reserve the LU for (user 50-$k$ of) the user terminal 10-$i$ even if other user terminal accessible to the LU corresponding to the user 50-$k$ exists, that is, user terminal now reserving the LU exists. The third request is a reservation release request to release the currently reserved LU by the user terminal 10-$i$ from a reserved state with respect to the storage device 30. The reservation release request is a request to release a state of reserving the LU (reserved right) when the user 50-$k$ ends the use of the user terminal 10-$i$.

The transmitter unit 104 transmits the initiator ID acquired by the acquisition unit 101 to the storage device 30. The transmitter unit 104 further transmits the foregoing reservation request, forced reservation request or reservation release request acquired by the acquisition unit 101 to the storage device 30 via the network 20 (see FIG. 1).

The storage device 30 has a transmitter/receiver unit 300, an LU database (DB) 301, a masking unit 302, LUs 303-1, 303-2, . . . 303-$n$, a reservation table 304, a reservation unit 305 and an access control unit 306.

The transmitter/receiver unit 300 receives the initiator ID transmitted by the transmitter unit 104 of an arbitrary user terminal (e.g., user terminal 10-$i$). The transmitter/receiver unit 300 further receives the reservation request, forced reservation request or reservation release request transmitted by the transmitter unit 104.

Moreover, the transmitter/receiver unit 300 transmits information indicating that the user terminal 10-$i$ is connected with the storage device 30, to the user terminal 10-$i$.

Usually in the iSCSI network, the computer ID 103 is used as an iSCSI name (iSCSI Initiator Name), while an identifier to identify a session in computers designated by the iSCSI name is used as an ISID (Initiator Session Identifier). Incidentally, in the iSCSI specification, an initiator ID is defined as a composition of an iSCSI name and an ISID.

On the contrary, according to this embodiment, the user ID 102 is used as the iSCSI name while the computer ID 103 is used as the ISID. In other words, according to this embodiment, the iSCSI name is changed depending on the user using the user terminal. In this case, the initiator ID (defined as a composition of an iSCSI name and an ISID) is a composition of a user ID and a computer ID.

The LU database 301 stores correspondences of a user ID with a LUN (Logical Unit Number) identifying a LU which is corresponding to the user identified by the user ID for m users.

The foregoing LUs 303-1, 303-2, ... 303-m store working environment information previously assigned for each of m users. Here the LU storing working environment for the user 50-k denotes LU 303-k.

The foregoing working environment includes configurations and/or data for the following various softwares and hardwares: the Operating System, printers, networks, application programs, graphic screens, disk drive and tape drive.

The masking unit 302 determines an LU corresponding to the user ID 102 included in the initiator ID received by the transmitter/receiver unit 300. Here, the masking unit 302 refers to the LU database 301, and thereby, determines the LU 303-k expressed by the LUN stored in the LUDB 301 corresponding to the user ID 102 identifying the user 50-k. In other words, the masking unit 302 maps the LU 303-k onto the user 50-k. Moreover, the masking unit 302 restricts access from the user terminal 10-i identified by the computer ID 103 included in the received initiator ID to the LU 303-k.

The reservation table 304 stores correspondences of LUN with an initiator ID including the computer ID of the user terminal now reserving an LU identified by the LUN.

The reservation unit 305 sets the following information in the reservation table 304 based on the reservation request received by the transmitter/receiver unit 300. Namely, the reservation unit 305 sets the initiator ID received by the transmitter/receiver unit 300 in the reservation table 304 corresponding to the LU 303-k. By doing so, the reservation unit 305 reserves the LU 303-k for the user terminal 10-i identified by the computer ID 103 included in the initiator ID.

The reservation unit 305 further sets the following information in the reservation table 304 based on the forced reservation request received by the transmitter/receiver unit 300. Namely, the reservation unit 305 unconditionally sets the initiator ID received by the transmitter/receiver unit 300 in the reservation table 304 corresponding to the LU 303k. By doing so, the reservation unit 305 reserves the LU 303-k for the user terminal 10-i identified by the computer ID 103 included in the initiator ID.

Moreover, the reservation unit 305 removes the initiator ID stored in the reservation table 304 corresponding to the LU 303-k based on the reservation release request received by the transmitter/receiver unit 300. By doing so, reservation for the LU 303-k by the user terminal 10-i is released.

The access control unit 306 refers to the reservation table 304 to permit or refuse access to the LU 303-k with respect to the user terminal 10-i.

Figure 3:
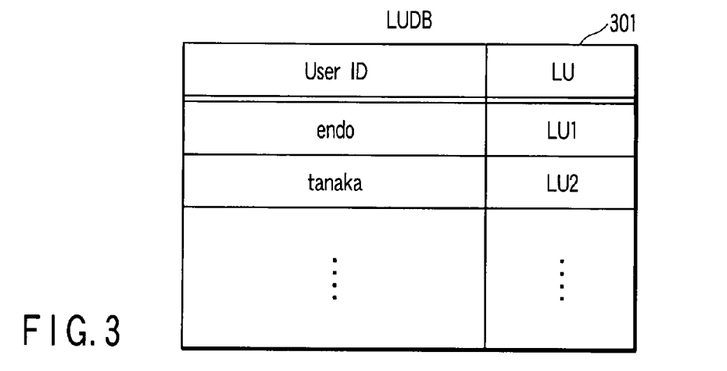
FIG. 3 is a table showing the data structure of an LU database 301 shown in FIG. 2.

FIG. 3 shows the data structure of the LU database 301. As seen from FIG. 3, the LU database 301 previously stores correspondences of a user ID with a LUN identifying the LU corresponding to the user identified by the user ID.

In FIG. 3, the LU database 301 stores identification information, that is, LU1 identifying the LU 303-1 of FIG. 2 corresponding to the user ID "endo". Moreover, the LU database 301 stores identification information, that is, LU2 identifying the LU 303-2 of FIG. 2 corresponding to the user ID "tanaka".

Figure 4:
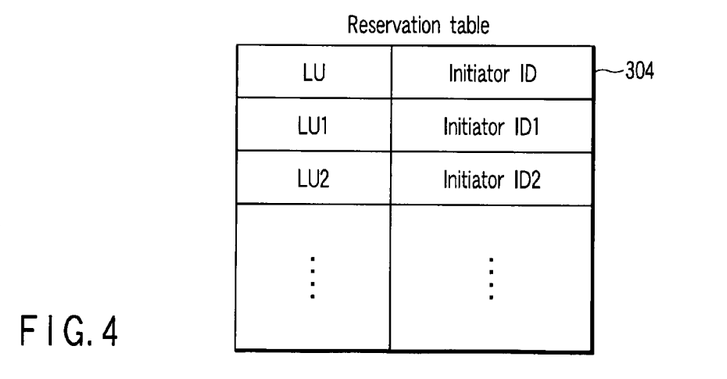
FIG. 4 is a view to explain the data structure of a reservation table 304 shown in FIG. 2.

FIG. 4 shows the data structure of the reservation table 304. In the reservation table 304, initiator ID including the computer ID identifying the user terminal reserving LU is stored corresponding to the LU.

In FIG. 4, the reservation table 304 stores LU1 corresponding to initiator ID 1 and LU2 corresponding to initiator ID 2.

The procedure of the storage system when a reservation request is issued from the user terminal 10-i to the storage device 30 will be explained below with reference to a sequence chart of FIG. 5. In this case, the user 50-k selects and uses the user terminal 10-i of the foregoing user terminals 10-1, 10-2, ... 10-n. Moreover, the LU corresponding to the user 50-k is the LU 303-k.

The acquisition unit 101 acquires the user ID 102 identifying the user 50-k and the computer ID 103 identifying the user terminal 10-i used by the user 50-k. In other words, the acquisition unit 101 acquires an initiator ID (=user ID 102+ computer ID 103) including the foregoing user ID 102 and computer ID 103 (step S1).

The transmitter unit 104 of the user terminal 10-i transmits the initiator ID acquired by the acquisition unit 101 to the storage device 30 (step S2). The initiator ID is transmitted, and thereby, the user terminal 10-i is connected to the storage device 30. Via this procedure, a logical communication path is formed (set) between the user terminal 10-i and the storage device 30. Thereafter, the user terminal 10-i can make communication with the storage device 30 via the communication path. When the user terminal 10-i is connected to the storage device 30, the transmitter/receiver unit 300 acknowledges it to the user 50-k via the user terminal 10-i (step S3).

The masking unit 302 of the storage device 30 refers to the LU database 301 to determine the LU 303-k identified by the LUN stored in the LUDB301 corresponding to the user ID 102 (step S4).

On the other hand, the user 50-k using the user terminal 10-i makes an operation of making a request to reserve the LU 303-k using the user terminal 10-i. In this case, the acquisition unit 101 of the user terminal 10-i acquires the reservation request to reserve the LU 303-k for the user terminal 10-i (user 50-k) in the storage device (step S5). The transmitter unit 104 notifies (transmits) the reservation request to the storage device 30 via the communication path (step S6).

When the reservation request is transmitted from the user terminal 10-i to the storage device 30, the reservation unit 305 of the storage device 30 takes the following procedure. Specifically, the reservation unit 305 refers to the reservation table 304 to find whether any initiator ID corresponding to the LU 303-k determined by the masking unit 302 is stored.

If no initiator ID corresponding to the LU 303-k is stored, the reservation unit 305 sets the initiator ID received by the transmitter/receiver unit 300 to the reservation table 304 corresponding to the LU 303-k. By doing so, the LU 303-k is reserved for the user terminal 10-i identified by the computer ID 103 included in the initiator ID received by the transmitter/receiver unit 300 (step S7).

On the contrary, if another initiator ID corresponding to the LU 303-k is already stored, the user terminal 10-i is notified of a reservation conflict (access refusal by reservation).

When the LU 303-k is reserved for the user terminal 10-i, the access control unit 306 permits the user terminal 10-i to access the LU 303-k (step S8).

Then, when the access control unit 306 permits accessing the LU 303-k, the user terminal 10-i is accessible to the working environment information of the user 50-k stored in the LU 303-k. Thus, the user 50-k starts the use of the user terminal 10-i based on the working environment information of the user 50-k (step S9).

The procedure taken when the user 50-k ends the use of the user terminal 10-i will be explained below. The user 50-k makes an operation of making a request to release the LU 303-k from the reservation using the user terminal 10-i. In this case, the acquisition unit 101 of the user terminal 10-i acquires a reservation release request for releasing the LU 303-k from the reserved (step S10). The reservation release request is transmitted to the storage device 30 by the transmitter unit 104 (step S11).

When reservation release request is transmitted from the user terminal 10-i, the reservation unit 305 of the storage device 30 refers to the reservation table 304 to confirm that the LU 303-k is reserved by the user terminal 10-i.

When confirming that the LU 303-k is reserved by the user terminal 10-i, the reservation unit 305 removes the initiator ID stored in the reservation table 304 corresponding to the LU 303-k. By doing so, the reserved right for the LU 303-k by the user terminal 10-i is released (step S12).

An acknowledgment that the reserved right is released by the reservation unit 305 is transmitted to the user terminal 10-i (step S13).

Figure 6:
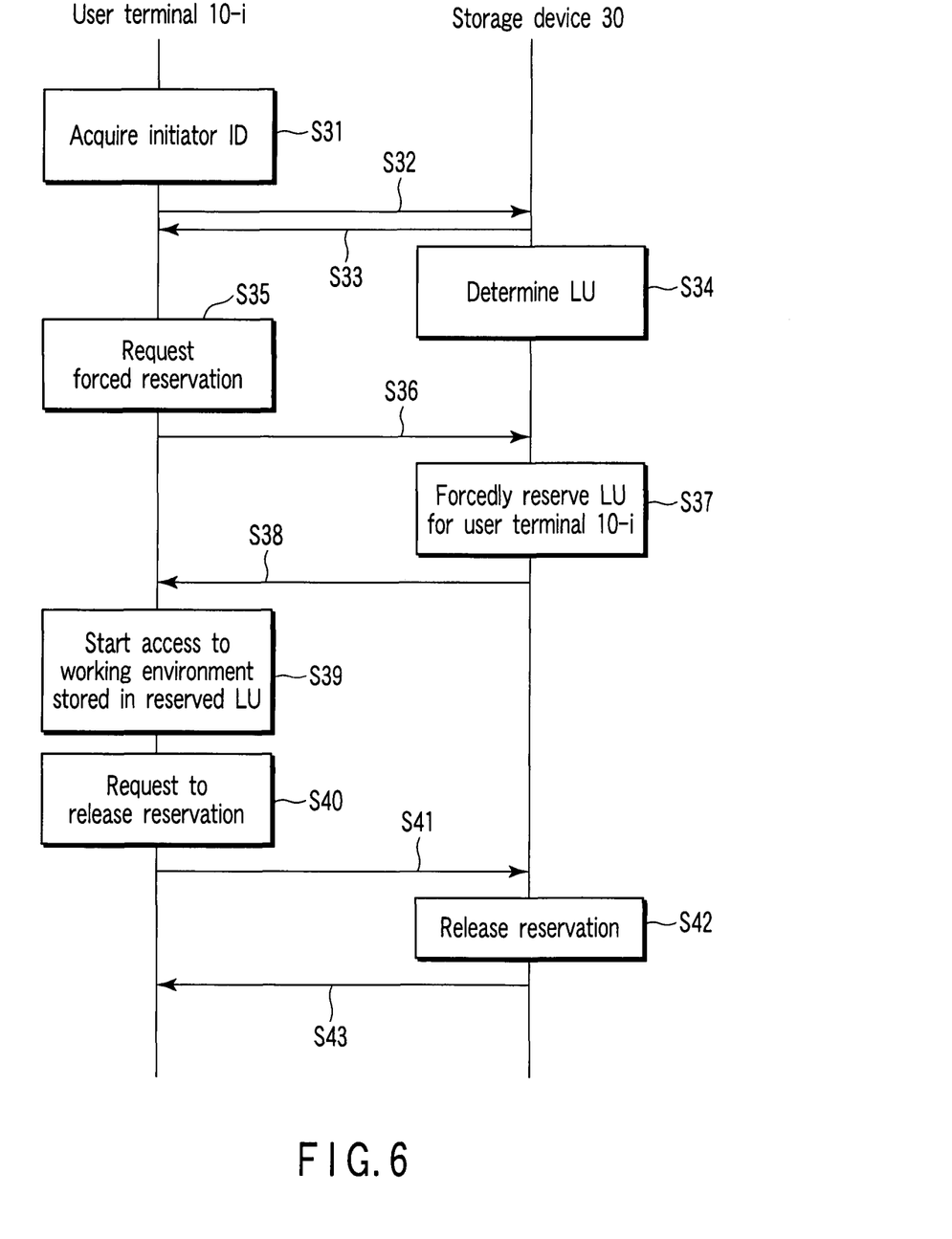
FIG. 6 is a sequence chart showing a storage system processing procedure when a forced reservation request is made with respect to the storage device 30 from the user terminal 10-$i$.

The procedure of the storage system when a forced reservation request is issued from the user terminal 10-i to the storage device 30 will be explained below with reference to a sequence chart of FIG. 6.

The forced reservation request is a request to forcedly reserve the LU 303-k for the user terminal 10-i in the following case. In this case, the user terminal 10-i accesses the LU 303-k in a state that the user 50-k accesses the LU 303-k using the user terminal 10-j of FIG. 2. Namely, this request is issued in the case where the user 50-k moves to the location of the user terminal 10-i without releasing the reserved state of the LU 303-k from the user terminal 10-j. Hereinafter, the LU 303-k is now reserved by the user terminal 10-j.

Figure 5:
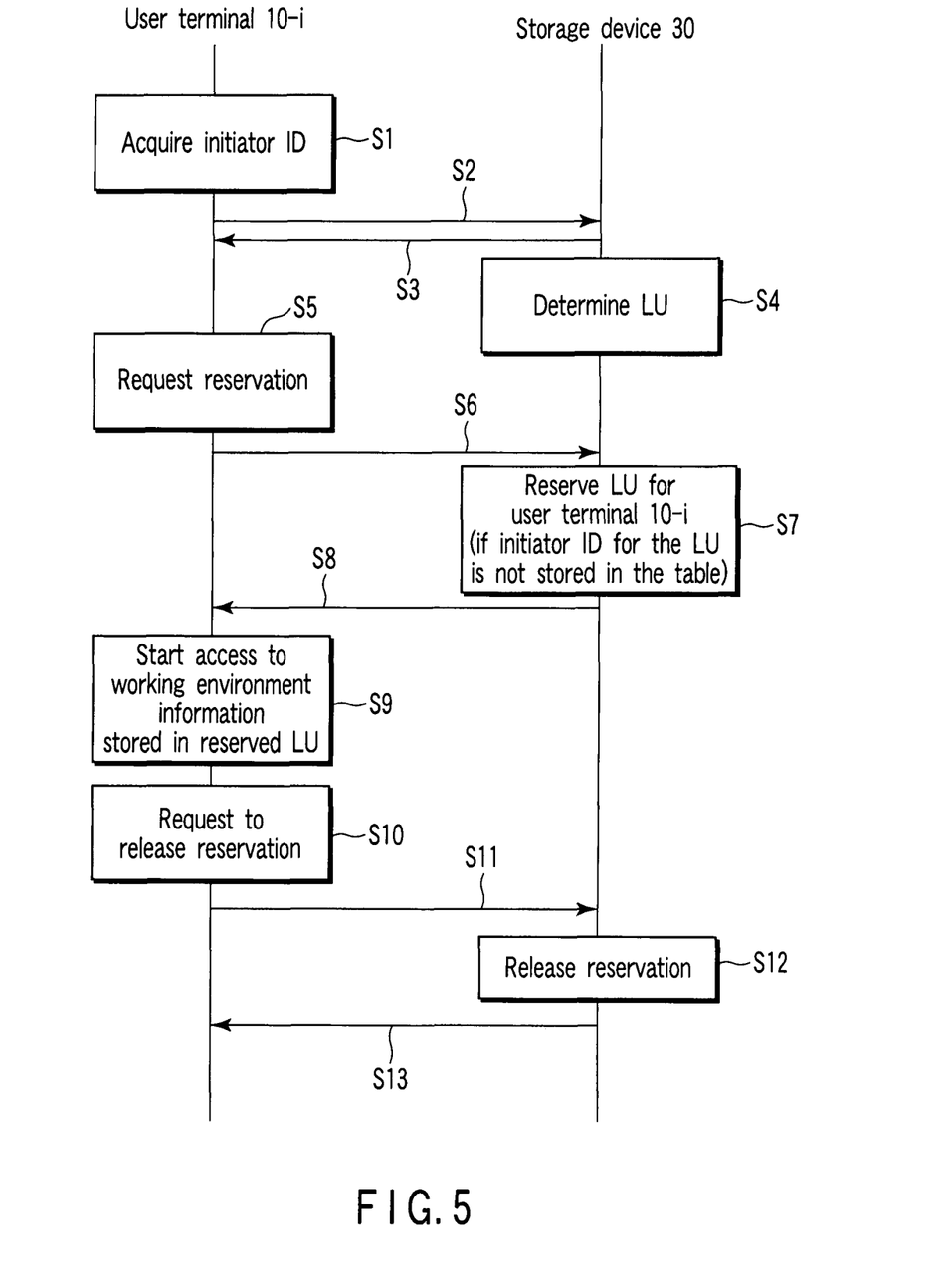
FIG. 5 is a sequence chart showing a storage system processing procedure when a reservation request is made with respect to the storage device 30 from the user terminal 10-$i$.

Like the case of FIG. 5, the user 50-k selects and uses the user terminal 10-i of user terminals 10-1, 10-2, . . . 10-n, and the LU corresponding to the user 50-k is LU 303-k.

The procedures from steps S31 to S34, which are equivalent to steps S1 to S4 of FIG. 5, are performed.

The user 50-k using the user terminal 10-i makes an operation of making a request to forcedly reserve the LU 303-k using the user terminal 10-i. In this case, the acquisition unit 101 of the user terminal 10-i acquires a forced reservation request to forcedly reserve the LU 303-k (step S35). The forced reservation request is transmitted to the storage device 30 by the transmitter unit 104 (step S36).

Then, the forced reservation request is transmitted from the user terminal 10-i to the storage device 30. In this case, the reservation unit 305 of the storage device 30 removes any initiator ID stored corresponding to the LU 303-k determined by the masking unit 302 if it is found. Then, the reservation unit 305 sets the initiator ID received by the transmitter/receiver unit 300 to the reservation table 304 corresponding to the LU 303-k (step S37). Namely, the reservation unit 305 forcedly reserves the LU 303-k for the user terminal 10-i identified by the computer ID 103 included in the initiator ID received by the transmitter/receiver unit 300.

According to the forced reservation request, the initiator ID including the computer ID identifying the user terminal 10-j is made invalid. In this case, the initiator ID received by the transmitter/receiver unit 300 may be set to entry of the reservation table 304 storing invalidated initiator ID. Moreover, the initiator ID may be newly set to another entry corresponding to the LU 303-k.

In this case, a reservation conflict notification is transmitted to the user terminal 10-j identified by the computer ID included in the invalidated initiator ID. The user terminal 10-j notified of the reservation conflict stops the operation after displaying a notification information on the display screen of the user terminal 10-j.

The forced reservation request is also used in the case where power failure happens in a state that the user terminal 10-j is now reserving the LU 303-k. In this case, the reservation release request will not be transmitted from the user terminal 10-j; therefore, the reserved state of the user terminal 10-j will not be released without a forced reservation request from another user terminal. On the other hand, if the user terminal 10-j is operating when the reservation unit 305 forcedly reserves the LU 303-k for the user terminal 10-i, the operation of the user terminal 10-j is stopped. Therefore, mutual exclusion is secured between user terminals 10-i and 10-j.

The procedures from steps S38 to S43, which are equivalent to steps S8 to S13 of FIG. 5, are performed.

According to the foregoing embodiment, the correspondence of the user ID 102 and the LU 303-k is previously stored in the LU database 301. By doing so, even if the correspondence of the user terminal 10-i and the LU 303-k changes, the correspondence of the user 50-k and the LU 303-k does not change. Therefore, there is no need of changing the LU database. Moreover, the reserved right is managed using the initiator ID including the computer ID identifying the user terminal 10-i used by the user 50-k. By doing so, mutual exclusion with another user terminal is secured.

Usually, in iSCSI network, a LU is mapped onto a computer using the computer ID 103 as an iSCSI name. On the contrary, according to this embodiment, the user ID 102 is used as an iSCSI name. By doing so, an ordinary mapping mechanism can be used to map the LU onto the user. Reservation is also readily managed without changing a ordinary mapping mechanism.

For example, it is assumed that the user tries to access to the LU 303-k from the user terminal 10-i while the user 50-k is accessing the LU 303-k from the user terminal 10-j. In this case, according to the forced reservation request, access to the LU 303-k is possible from the user terminal 10-i without disconnecting the user terminal 10-j.

The storage device 30 may be provided with an authentication unit. The authentication unit uses the user ID 102 included in the initiator ID transmitted by the transmitter unit 104 of the user terminal 10-i as an authenticated object to authenticate the user 50-k.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A storage system comprising:
computers configured to be used by users; and
a storage device shared by the computers, the storage device comprising logical units corresponding to the users,
each of the computers comprising:
an acquisition unit configured to acquire a first initiator identification in accordance with an operation by a user when the user uses a first computer, the first initiator identification including a user identification identifying the user and a first computer identification identifying the first computer; and a transmitter unit configured to transmit the first initiator identification acquired by the acquisition unit to the storage device when the first initiator identification is acquired by the acquisition unit and the first computer is connected to the storage device, and the storage device comprising:

a receiver unit configured to receive the first initiator identification transmitted by the transmitter unit;

a database configured to store information in association with user identifications of the users, the information indicating the logical units corresponding to the users identified by the user identifications;

a masking unit configured to refer to the database in order to determine a logical unit corresponding to the user identification included in the first initiator identification, and further configured to restrict access from the first computer, when the first initiator identification is received by the receiver unit;

a data structure configured to store a second initiator identification corresponding to the logical unit determined by the masking unit, the second initiator identification including a second computer identification identifying a second computer having permission of access to the logical unit; and an access control unit configured to refuse access by the first computer when a comparison of the first initiator identifier with the second initiator identifier determines that the first initiator identification differs from the second initiator identification.

2. The storage system according to claim 1, wherein the first computer and the storage device are connectable according to an iSCSI (Internet Small Computer Systems Interface) protocol, the transmitter unit and the receiver unit transmits and receives information according to the iSCSI protocol, and transmits the user identification as an ISCSI initiator name while transmitting the computer identification as an ISID (Initiator Session Identifier), and the masking unit refers to the database to determine a logical unit corresponding to the user identification received as the iSCSI name.

3. The storage system according to claim 1, wherein the storage device further includes:

a reservation unit configured to set the first initiator identification received by the receiver unit in the data structure corresponding to the logical unit determined by the masking unit when an initiator identification including a computer identification identifying a computer permitted access to the logical unit determined by the masking unit is not stored in the data structure corresponding to the logical unit determined by the masking unit; and wherein the access control unit permits access to the logical unit determined by the masking unit with respect to the computer identified by the computer identification included in the initiator identification set by the reservation unit.

4. The storage system according to claim 3, wherein the acquisition unit acquires a request to forcedly permit access to the logical unit determined by the masking unit from a user identified by the user identification, the transmitter unit transmits the request acquired by the acquisition unit to the storage device via a communication path formed between a computer having the transmitter unit by which the initiator identification transmitted by the transmitter unit is received by the receiver unit and the storage device, the receiver unit receives the request transmitted by the transmitter unit, the reservation unit invalidates a different initiator identification when the request is received by the receiver unit, and an initiator identification different from the first initiator identification received by the receiver unit is stored in the table corresponding to the logical unit determined by the masking unit, and sets the first initiator identification to the table corresponding to the logical unit determined by the masking unit, and the access control unit permits access to the logical unit determined by the masking unit with respect to the computer identified by the computer identification included in the initiator identification set by the reservation unit, and refuses access to the logical unit determined by the masking unit with respect to computers other than the computer identified by the computer identification included in the initiator identification set by the reservation unit.

5. The storage system according to claim 4, wherein a computer identified by the computer identification included in the different initiator identification stops the operation if the access control unit refuses access to the logical unit determined by the masking unit.

6. A storage device shared by computers used by users, the storage device comprising logical units corresponding to the users, the storage device further comprising:

a receiver unit configured to receive a first initiator identification including a user identification identifying a user using an arbitrary computer of the computers and a first computer identification identifying the arbitrary computer when the user uses the arbitrary computer, the first initiator identification transmitted from the arbitrary computer to the storage device;

a database configured to store information in association with user identifications of the users, the information indicating the logical units corresponding to the users identified by the user identifications;

a masking unit configured to refer to the database in order to determine a logical unit corresponding to the user identification included in the first initiator identification, and configured to restrict access from the arbitrary computer to the logical unit, when the first initiator identification is received by the receiver unit;

a data structure configured to store a second initiator identification corresponding to the logical unit determined by the masking unit, the second initiator identification including a second computer identification identifying a computer having permission of access to the logical unit; and an access control unit configured to refuse access to the logical unit by the arbitrary computer when a comparison of the first initiator identification with the second initiator identification determines that the first initiator identification differs from the second initiator identification.

7. The storage device according to claim 6, further comprising:

a reservation unit configured to set the first initiator identification in the data structure corresponding to the logical unit determined by the masking unit if the second initiator identification is not stored in the data structure corresponding to the logical unit determined by the masking unit; wherein the access control unit permits access to the logical unit determined by the masking unit with respect to the arbitrary computer.

8. A method of controlling access to a logical unit corresponding to a user using a computer from each of computers, the method being applied to:

a storage system which comprises:
- computers used by users and a storage device which is shared by the computers and comprises logical units corresponding to the users;
- a database which stores information in association with user identifications of the users, and logical units corresponding to the users identified by the user identifications; and
- a data structure which stores a second initiator identification in association with the logical unit, the second initiator identification including a second computer identification identifying a computer having permission of access to the logical unit, the method comprising:
- acquiring, by an arbitrary computer of the computers, a first initiator identification in accordance with an operation by a user when the user uses the arbitrary computer, the first initiator identification including a user identification identifying the user making an operation and a first computer identification identifying the arbitrary computer;
- transmitting, by the arbitrary computer, the first initiator identification to the storage device when the first initiator identification is acquired and the arbitrary computer is connected to the storage device;
- receiving, by the storage device, the first transmitted initiator identification;
- referring, by the storage device, to the database in order to determine a logical unit corresponding to the user identification included in the first initiator identification, and restricting access from the arbitrary computer to the logical unit, when the first initiator identification is received;
- determining, by the storage device, whether or not the first initiator identification differs from the second initiator identification stored in the data structure and corresponding to the determined logical unit; and
- refusing, by the storage device, access to the logical unit from the arbitrary computer identified by the first computer when it is determined that the first initiator identification differs from the second initiator identification stored in the data structure.

* * * * *